US008651208B2

(12) United States Patent
Ichikawa

(10) Patent No.: US 8,651,208 B2
(45) Date of Patent: Feb. 18, 2014

(54) ELECTRICAL POWERED VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 180 days.

(21) Appl. No.: 13/122,841

(22) PCT Filed: Oct. 9, 2008

(86) PCT No.: PCT/JP2008/068359
§ 371 (c)(1),
(2), (4) Date: Apr. 6, 2011

(87) PCT Pub. No.: WO2010/041320
PCT Pub. Date: Apr. 15, 2010

(65) Prior Publication Data
US 2011/0214926 A1    Sep. 8, 2011

(51) Int. Cl.
*B60W 10/30* (2006.01)
(52) U.S. Cl.
USPC ................................ 180/65.27; 180/65.1
(58) Field of Classification Search
USPC ............ 180/2.1, 2.2, 167, 65.1, 65.31, 65.21, 180/65.27; 307/104, 108, 9.1, 149
See application file for complete search history.

(56) References Cited

U.S. PATENT DOCUMENTS

| 4,800,328 | A | * | 1/1989 | Bolger et al. ................. 320/106 |
| 5,440,924 | A | | 8/1995 | Itsuji et al. |
| 5,596,261 | A | * | 1/1997 | Suyama ........................ 320/152 |
| 5,661,391 | A | | 8/1997 | Ito et al. |
| 6,154,005 | A | | 11/2000 | Hyogo et al. |
| 6,166,498 | A | | 12/2000 | Yamaguchi et al. |
| 6,525,510 | B1 | * | 2/2003 | Ayano et al. .................. 320/109 |
| 7,451,839 | B2 | * | 11/2008 | Perlman ......................... 180/2.1 |
| 7,741,734 | B2 | | 6/2010 | Joannopoulos et al. |
| 7,880,337 | B2 | * | 2/2011 | Farkas .......................... 307/104 |
| 8,008,888 | B2 | * | 8/2011 | Oyobe et al. .................. 320/108 |
| 2005/0068009 | A1 | | 3/2005 | Aoki |

(Continued)

FOREIGN PATENT DOCUMENTS

AU    2006269374 82    1/2007
AU    2006269374 C1    1/2007

(Continued)

OTHER PUBLICATIONS

Kurs et al., "Wireless Power Transfer via Strongly Coupled Magnetic Resonances," *Science*, Jul. 6, 2007, pp. 83-86, vol. 317, <www.sciencemag.org>.

(Continued)

*Primary Examiner* — Hau Phan
(74) *Attorney, Agent, or Firm* — Oliff PLC

(57) ABSTRACT

A power reception unit includes a secondary self-resonant coil receiving electric power from a power transmission unit of a power feeding device by resonating with a primary self-resonant coil included in the power transmission unit through an electromagnetic field. The power reception unit is stored in an engine room where a driving power generation unit including an engine and motor generator are stored. In detail, the power reception unit is arranged at the bottom of the engine room. A shielding member is provided to electromagnetically shield the engine room from inside and outside. For example, the shielding member is formed of a cloth, sponge, or the like having an electromagnetic shielding effect, and is arranged at the inner surface of the engine room.

17 Claims, 5 Drawing Sheets

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2009/0127937 A1* | 5/2009 | Widmer et al. ............... 307/149 |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0230777 A1* | 9/2009 | Baarman et al. ............... 307/104 |
| 2009/0267709 A1 | 10/2009 | Joannopoulos et al. |
| 2009/0267710 A1 | 10/2009 | Joannopoulos et al. |
| 2010/0090524 A1* | 4/2010 | Obayashi ..................... 307/9.1 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0201309 A1* | 8/2010 | Meek ........................... 320/108 |
| 2010/0207458 A1 | 8/2010 | Joannopoulos et al. |
| 2010/0225175 A1 | 9/2010 | Karalis et al. |
| 2010/0225271 A1* | 9/2010 | Oyobe et al. ............... 180/65.21 |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0295506 A1* | 11/2010 | Ichikawa ..................... 307/104 |
| 2011/0049978 A1* | 3/2011 | Sasaki et al. .................. 307/9.1 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-11-273977 | 10/1949 |
| JP | A-7-170612 | 7/1995 |
| JP | A-8-9512 | 1/1996 |
| JP | A-8-237890 | 9/1996 |
| JP | A-2001-177915 | 6/2001 |
| JP | A-2001-294048 | 10/2001 |
| JP | A-2002-291113 | 10/2002 |
| JP | A-2004-229421 | 8/2004 |
| JP | A-2005-101392 | 4/2005 |
| JP | A-2005-110399 | 4/2005 |
| JP | A-2007-39029 | 2/2007 |
| JP | A-2008-054424 | 3/2008 |
| JP | A-2009-501510 | 1/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

OTHER PUBLICATIONS

International Search Report for International Patent Application No. PCT/JP2008/068359, mailed on Jan. 13, 2009 (w/ English translation).

Dec. 6, 2011 Japanese Office Action issued in Japanese Patent Application No. 2010-532737 (with translation).

* cited by examiner

ELECTRICAL POWERED VEHICLE

TECHNICAL FIELD

The present invention relates to electrical powered vehicles, particularly, an electrical powered vehicle capable of power reception in a non-contact manner from a power feeding device external to the vehicle by causing resonance between resonators mounted on each of the power feeding device and the vehicle through an electromagnetic field.

BACKGROUND ART

Great attention is focused on electrical powered vehicles such as an electric vehicle and hybrid vehicle as environment-friendly vehicles. These vehicles incorporate an electric motor for generating a driving force for running, and a rechargeable power storage device for storing electric power to be supplied to the electric motor. A hybrid vehicle refers to a vehicle incorporating an internal combustion engine as a power source, in addition to an electric motor, or a vehicle further incorporating a fuel cell in addition to a power storage device as the direct current power source for driving the vehicle.

Among the hybrid vehicles there is known a vehicle that allows charging of the vehicle-mounted power storage device from a power source external to the vehicle, likewise with an electric vehicle. For example, the so-called "plug-in hybrid vehicle" is known that allows the power storage device to be charged from a general household power supply by establishing connection between the plug socket located at an establishment and the charging inlet provided at the vehicle through a charging cable.

As a method for power transfer, attention is recently focused on wireless electrical power transmission without using power supply cords and/or cables for electrical transmission. Three promising approaches of this wireless power transfer technique are known, i.e. power transfer using electromagnetic induction, power transfer using electromagnetic waves, and power transfer through the resonance method.

The resonance method thereof is a non-contact power transfer approach transferring power via an electromagnetic field by causing resonance at a pair of resonators (for example, a pair of self-resonant coils) at the electromagnetic field (near field), allowing electric power as high as several kW to be transferred over a relatively long distance (for example, several meters) (refer to Non-Patent Document 1).
Patent Document 1: Japanese Patent Laying-Open No. 8-237890
Non-Patent Document 1: Andre Kurs et al., "Wireless Power Transfer via Strongly Coupled Magnetic Resonances", [online], Jul. 6, 2007, Science, Volume 317, p. 83-86, [Searched on Sep. 12, 2007], Internet<URL; http://www-.sciencemag. org/cgi/reprint/317/5834/83.pdf>

DISCLOSURE OF THE INVENTION

Problems to be Solved by the Invention

In the case where the wireless power transfer technique disclosed in the aforementioned "Wireless Power Transfer via Strongly Coupled Magnetic Resonances" is applied to a vehicle system, a configuration ensuring the mounting position of a power reception resonator and blocking the leakage electromagnetic field generated at the time of power reception at the vehicle must be realized at low cost. The aforementioned documents do not present or specifically take into account such a problem.

Therefore, an object of the present invention is to realize at low cost, in an electrical powered vehicle capable of receiving power from a power feeding device external to the vehicle by the resonance method, a configuration ensuring the mounting position of a power reception resonator and blocking the leakage electromagnetic field generated at the time of power reception.

Means for Solving the Problems

An electrical powered vehicle according to the present invention is capable of generating a running driving power by an electric motor utilizing electric power supplied from a power feeding device provided external to the vehicle. The electrical powered vehicle includes a power reception unit, a storage chamber, and a shielding member. The power reception unit includes a power reception resonator receiving electric power from a power transmission resonator included in the power feeding device by resonating with the power transmission resonator through an electromagnetic field. The power reception unit is stored in the storage chamber. The shielding member electromagnetically shields the storage chamber from inside and outside.

Preferably, the electrical powered vehicle further includes an internal combustion engine. The internal combustion engine generates the energy for running. The storage chamber is an engine room where the internal combustion engine is stored.

Also preferably, the storage chamber is a luggage compartment where the luggage of a user is stored.

Also preferably, the storage chamber is a chamber where the electric motor is stored.

Also preferably, the electrical powered vehicle further includes an electric power conversion device. The electric power conversion device carries out power conversion between a power supply line in the vehicle and the electric motor. The storage chamber is a compartment where the electric power conversion device is stored.

Preferably, the power reception unit is arranged at the bottom of the storage chamber.

Preferably, the electrical powered vehicle further includes a door to open and close the storage chamber, and an interlock mechanism for interrupting or prohibiting power reception from the power feeding device when the door attains an open state.

Further preferably, the interlock mechanism includes a detection device, and a communication device. The detection device detects an open/close state of the door of the storage chamber. The communication device transmits to the power feeding device, when a door open state is detected by the detection device, a command designating interruption or prohibition of power transmission from the power feeding device.

Effects of the Invention

In the present invention, a shielding structure enclosing the power reception resonator (for example, an exclusive shielding box, or the like) does not have to be additionally provided at the power reception unit since a shielding member is provided at the storage chamber where the power reception unit is stored. According to the present invention, the mounting space of the power reception unit can be made smaller, and the leakage electromagnetic field generated at the time of power reception can be blocked at low cost.

Figure 1:
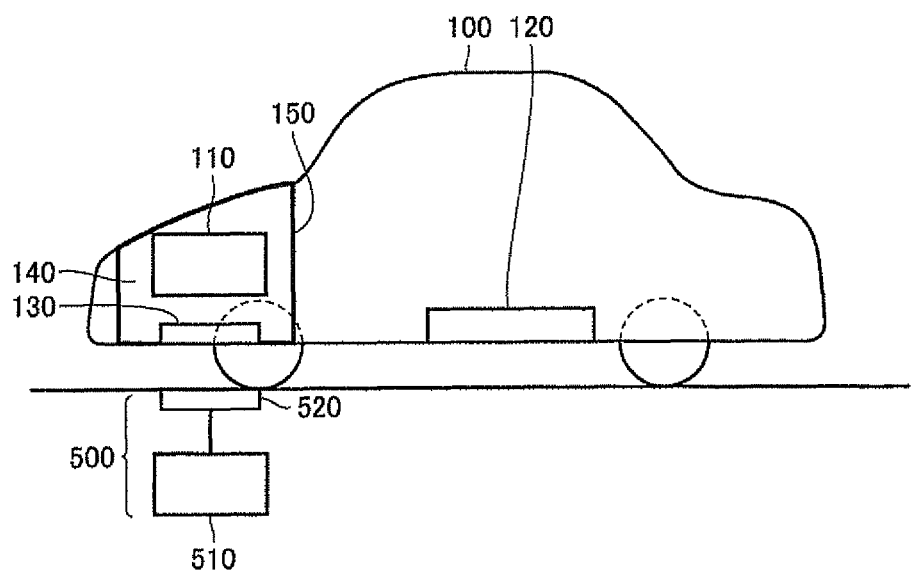
FIG. 1 represents an entire configuration indicating characteristic portions of a hybrid vehicle shown as an example of an electrical powered vehicle according to a first embodiment of the present invention.

DESCRIPTION OF THE REFERENCE SIGNS 100, 100A-100C hybrid vehicle; 110 driving power generation unit; 120 power storage device; 130 power reception unit; 140 engine room; 150, 230 shielding member; 180, 250 open/close sensor; 190 communication device; 210 trunk room; 220 floor; 310, 510 high frequency power source; 320 primary coil; 330 primary self-resonant coil; 340, 450 secondary self-resonant coil; 350, 452 secondary coil; 360 load; 410 boost converter; 420, 422 inverter; 430, 432 motor generator; 434 engine; 436 power split device; 438 driving wheel; 440 vehicle ECU; 460 rectifier; 500 power feeding device; 520 power transmission unit; SMR1, SMR2 system main relay; PL1, PL2 positive line; NL1, NL2 negative line.

BEST MODES FOR CARRYING OUT THE INVENTION

Embodiments of the present invention will be described hereinafter in detail with reference to the drawings. The same or corresponding elements in the drawings have the same reference characters allotted, and description thereof will not be repeated.

First Embodiment

FIG. 1 represents an entire configuration indicating characteristic portions of a hybrid vehicle shown as an example of an electrical powered vehicle according to a first embodiment of the present invention. Referring to FIG. 1, hybrid vehicle 100 includes a driving power generation unit 110, a power storage device 120, a power reception unit 130, an engine room 140, and a shielding member 150.

Driving power generation unit 110 generates a driving power of the vehicle, and outputs the generated driving power to a driving wheel (for example, the front wheel) via a reduction gear and a driving shaft not shown. In detail, driving power generation unit 110 includes an engine and a motor generator, generating a vehicle driving power by at least one of the engine and motor generator. The motor generator receives electric power from power storage device 120 to generate driving power. Driving power generation unit 110 effects regeneration by the motor generator, and outputs the generated regenerative electric power to power storage device 120. This driving power generation unit 110 is stored in engine room 140.

Power storage device 120 is a rechargeable DC power source, formed of a secondary battery such as of nickel-metal hydride or lithium ion, or a capacitor of large capacitance. Power storage device 120 stores the electric power received by a power reception unit 130 that will be described afterwards, as well as the regenerative electric power generated at driving power generation unit 110. Power storage device 120 supplies the stored electric power to the motor generator of driving power generation unit 110. Although power storage device 120 is arranged at substantially the middle in the longitudinal direction of the vehicle (beneath the passenger seat, or the like), it may be disposed at the trunk room located at the rear section of the vehicle.

Power reception unit 130 receives the electric power supplied from power feeding device 500 provided external to the vehicle in a non-contact manner. In detail, power reception unit 130 includes a secondary self-resonant coil (LC resonant coil) receiving electric power from a primary self-resonant coil (LC resonant coil) included in power transmission unit 520 of power feeding device 500 by resonating with the primary self-resonant coil through an electromagnetic field, and uses the secondary self-resonant coil for power reception in a non-contact manner from power transmission unit 520 of power feeding device 500. Power reception unit 130 is stored in engine room 140, specifically at the bottom of engine room 140. The electric power received by power reception unit 130 is rectified by a rectifier not shown to be supplied to power storage device 120.

Shielding member 150 is provided to electromagnetically shield engine room 140 from inside and outside. For example, shielding member 150 is formed of a cloth, sponge, or the like having an electromagnetic wave shielding effect, and is attached to the inner surface of engine room 140. The bottom of engine room 140 is open at the region where at least power reception unit 130 is disposed, and shielding member 150 is not provided at that opening.

Power feeding device 500 includes a high frequency power source 510, and a power transmission unit 520. High frequency power source 510 converts the electric power received from a system power source into electric power of high frequency. The converted high frequency electric power is output to power transmission unit 520. The high frequency electric power generated by high frequency power source 510 has a frequency of 1 MHz to ten and several MHz, for example. Power transmission unit 520 includes a primary self-resonant coil (LC resonant coil) to transfer the electric power received from high frequency power source 510 to power reception unit 130 of a hybrid vehicle 100 by resonating with the secondary self-resonant coil (LC resonant coil) included in power reception unit 130 of the vehicle side through an electromagnetic field.

At hybrid vehicle 100, power reception unit 130 is stored in and located at the bottom of engine room 140. In view of the generation of leakage electromagnetic field from power reception unit 130 at the time of receiving electric power from power feeding device 500, the present first embodiment has a shielding member 150 provided at the inner surface, for example, of engine room 140 where power reception unit 130 is stored, without having to additionally provide an exclusive shielding box or the like for storing power reception unit 130. Accordingly, the space for mounting power reception unit 130 can be saved since it is not necessary to additionally provide an exclusive shielding box or the like.

In general, the reflected power is increased if the distance between the power reception unit (secondary self-resonant coil) and the shielding member (shielding distance) is small, leading to reduction in efficiency. In the present first embodiment, a shielding member is provided at engine room 140 where power reception unit 130 is stored, instead of providing a shielding structure at power reception unit 130 per se. Therefore, a long shielding distance can be taken. As a result, reduction in the efficiency caused by providing a shielding structure can be suppressed.

Figure 2:
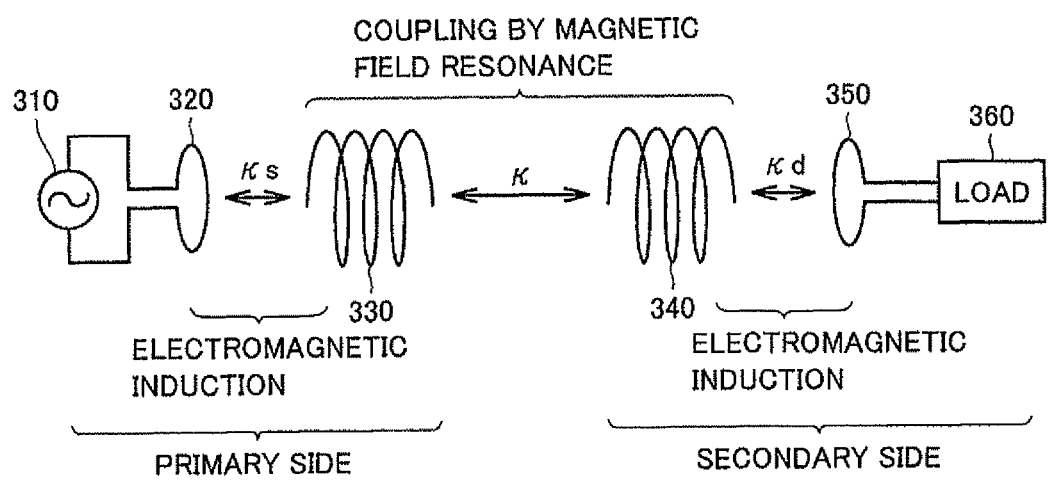
FIG. 2 is a diagram to describe the mechanism of power transmission by a resonance method.

FIG. 2 is a diagram to describe the mechanism of power transmission by the resonance method. Referring to FIG. 2, the resonance method is similar to the resonance of two tuning forks. By the resonance of two LC resonant coils having the same natural frequency at the electromagnetic field (near field), electric power is transferred from one coil to the other coil via the electromagnetic field.

Specifically, primary coil 320 is connected to high frequency power source 310, and electric power of a frequency as high as 1 MHz to ten and several MHz is supplied to primary self-resonant coil 330 that is magnetically coupled with primary coil 320 by electromagnetic induction. Primary self-resonant coil 330 is an LC resonator based on the coil's inductance and floating capacitance, resonating with secondary self-resonant coil 340 having the same resonant frequency as primary self-resonant coil 330 via an electromagnetic field (near field). Accordingly, energy (electric power) is transferred from primary self-resonant coil 330 to secondary self-resonant coil 340 via the electromagnetic field. The energy (electric power) transferred to secondary self-resonant coil 340 is extracted by secondary coil 350 magnetically coupled with secondary self-resonant coil 340 through electromagnetic induction to be provided to a load 360. Power transmission by the resonance method is realized when the Q value representing the resonance strength between primary self-resonant coil 330 and secondary self-resonant coil 340 is higher than 100, for example.

The corresponding relationship with the elements in FIG. 1 will be described hereinafter. Power reception unit 130 of FIG. 1 corresponds to secondary self-resonant coil 340 and secondary coil 350 of FIG. 2. High frequency power source 510 of FIG. 1 corresponds to high frequency power source 310 of FIG. 2. Power transmission unit 520 of FIG. 1 corresponds to primary coil 320 and primary self-resonant coil 330 of FIG. 2.

Figure 3:
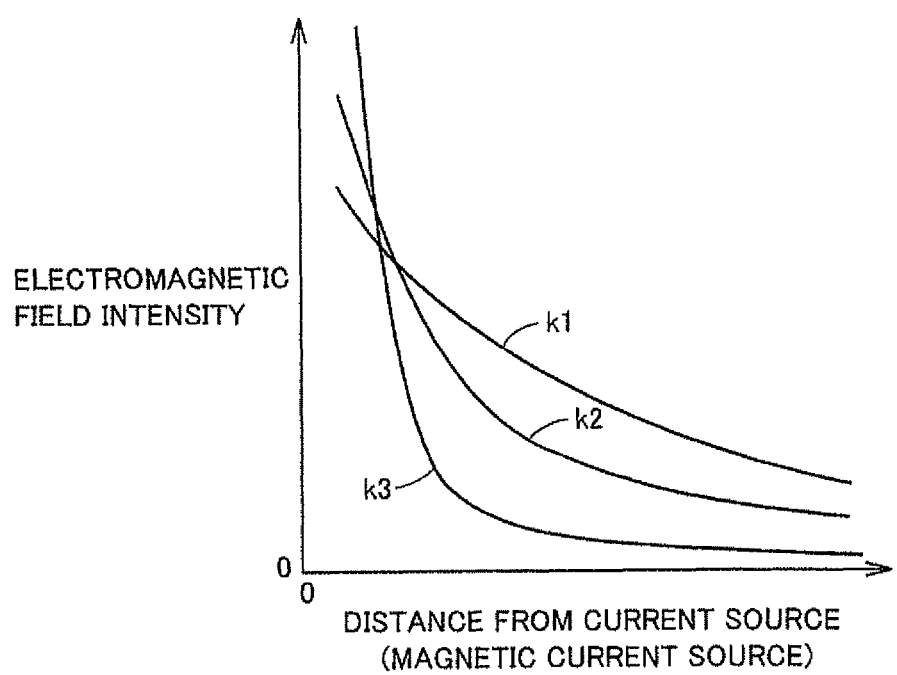
FIG. 3 represents the relationship between the distance from the current source (magnetic current source) and intensity of the electromagnetic field.

FIG. 3 represents the relationship between the distance from a current source (magnetic current source) and the electromagnetic field intensity. Referring to FIG. 3, the electric magnetic field is composed of three components. Curve k1 represents a component inversely proportional to the distance from the wave source, and is referred to as "radiation electromagnetic field". Curve k2 represents a component inversely proportional to the square of the distance from the wave source, and is referred to as "induction electromagnetic field". Curve k3 represents a component inversely proportional to the cube of the distance from the wave source, and is referred to as "electrostatic electromagnetic field".

There is a region among these where the intensity of the electromagnetic wave decreases drastically according to the distance from the wave source. In the resonance method, energy (electric power) is transmitted taking advantage of the near field (evanescent field). Specifically, a pair of resonators having the same natural frequency (for example, a pair of LC resonant coils) is caused to resonate utilizing the near field, whereby energy (electric power) is transferred from one resonator (primary self-resonant coil) to the other resonator (secondary self-resonant coil). Since the near field does not pass on energy far away, the resonance method allows power transmission with lower energy loss as compared to an electromagnetic wave that transmits energy (electric power) by the "radiation electromagnetic field" that passes on energy over a great distance.

Figure 4:
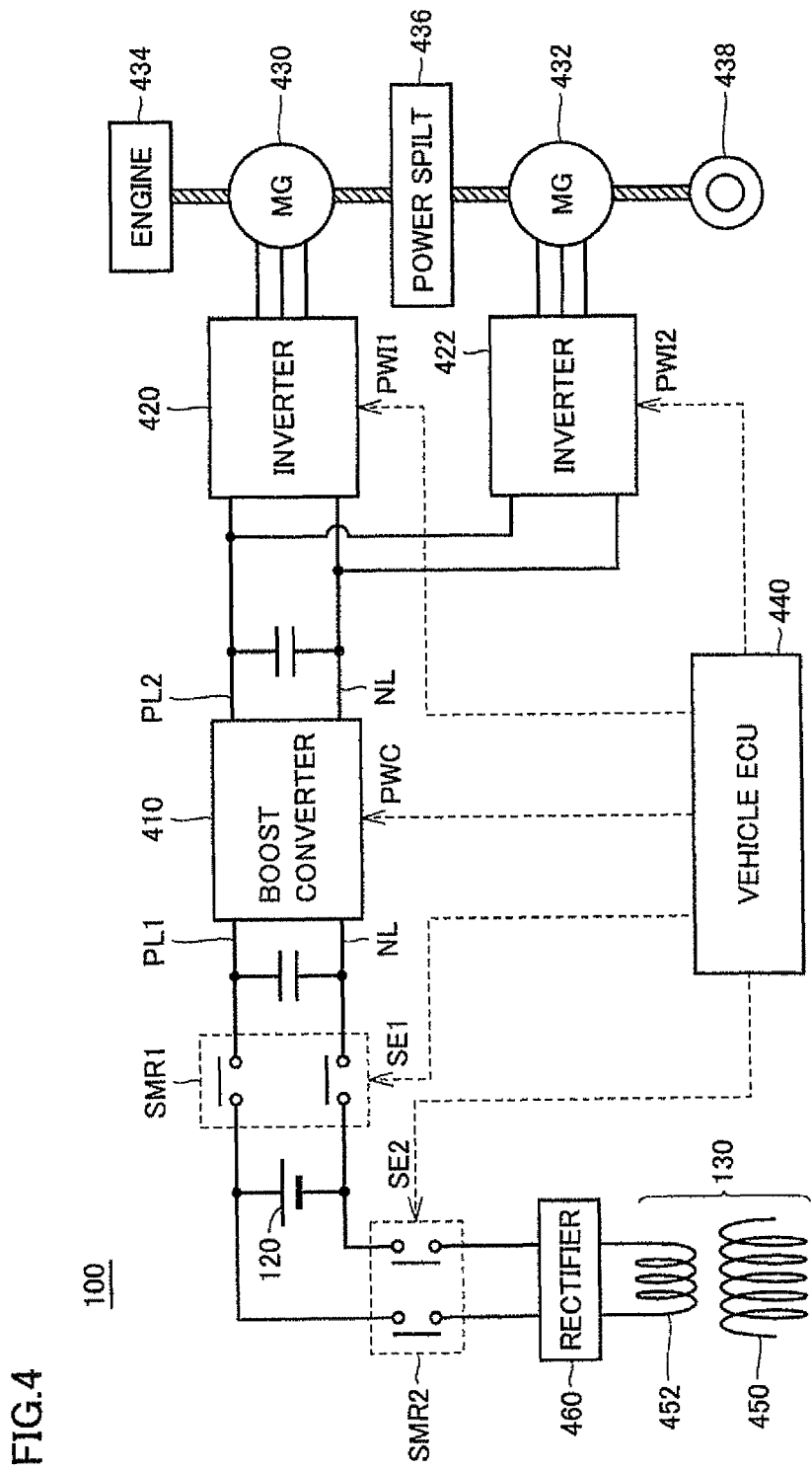
FIG. 4 is a block diagram representing a powertrain configuration of the hybrid vehicle of FIG. 1.

FIG. 4 is a block diagram representing a powertrain configuration of hybrid vehicle 100 of FIG. 1. Referring to FIG. 4, hybrid vehicle 100 includes a power storage device 120, a system main relay SMR1, a boost converter 410, inverters 420, 422, motor generators 430, 432, an engine 434, a power split device 436, a driving wheel 438 and a vehicle ECU 440. Additionally, hybrid vehicle 100 further includes secondary self-resonant coil 450, secondary coil 452, rectifier 460, and system main relay SMR2.

Hybrid vehicle 100 incorporates engine 434 and motor generator 432 as the driving source. Engine 434 and motor generators 430 and 432 are coupled with power split device 436. Hybrid vehicle 100 runs by the driving power generated by at least one of engine 434 and motor generator 432. The power generated by engine 434 is divided into two paths by power split device 436. Specifically, one path is directed to driving wheel 438, and the other path is directed to motor generator 430.

Motor generator 430 is an AC rotating electric machine formed of, for example, a 3-phase AC synchronous electric motor having a permanent magnet embedded in a rotor. Motor generator 430 generates electric power using the kinetic energy of engine 434 divided by power split device 436. For example, when the SOC of power storage device 120 is reduced, engine 434 is started and electric power is generated by motor generator 430, whereby power storage device 120 is charged.

Motor generator 432 is also an AC rotating electric machine formed of, for example, a 3-phase AC synchronous electric motor having a permanent magnet embedded in a rotor, likewise with motor generator 430. Motor generator 432 generates driving power using at least one of the electric power stored at power storage device 120 and the electric power generated by motor generator 430. The driving power of motor generator 432 is transmitted to driving wheel 438.

In a braking mode of the vehicle or in an acceleration reducing mode at a downward slope, the mechanical energy stored at the vehicle as a kinetic energy or potential energy is used for the rotational drive of motor generator 432 through driving wheel 438, whereby motor generator 432 operates as a power generator. Accordingly, motor generator 432 operates as a regenerative brake converting the running energy into electric power to generate the braking force. The electric power generated by motor generator 432 is stored in power storage device 120.

Power split device 436 is formed of a planetary gear set including a sun gear, a pinion gear, a carrier, and a ring gear. The pinion gear engages with the sun gear and ring gear. The carrier supports the pinion gear to allow rotation on its axis, and is coupled to the crankshaft of engine 434. The sun gear is coupled to the rotational shaft of motor generator 430. The ring gear is coupled to the rotational shaft of motor generator 432 and to driving wheel 438.

System main relay SMR1 is disposed between power storage device 120 and boost converter 410. System main relay SMR1 is set on/off according to a signal SE1 from vehicle ECU 440. Boost converter 410 responds to a signal PWC from vehicle ECU 440 to boost the voltage output from power storage device 120 for output onto positive line PL2. A DC chopper circuit, for example, constitutes this boost converter 410.

Inverters 420 and 422 are provided corresponding to motor generators 430 and 432, respectively. Inverter 420 responds to a signal PWI1 from vehicle ECU 440 to drive motor generator 430. Inverter 422 responds to a signal PWI2 to drive motor generator 432. A 3-phase bridge circuit, for example, constitutes each of inverters 420 and 422.

Boost converter 410, inverters 420, 422, motor generators 430, 432, engine 434, and power split device 436 constitute driving power generation unit 110 of FIG. 1.

Secondary self-resonant coil 450 is an LC resonant coil having both ends open (non-connected) and receives the electric power from power feeding device 500 by resonating with the primary self-resonant coil included in power transmission unit 520 of power feeding device 500 (FIG. 1) via an electromagnetic field. For the capacitor component of secondary self-resonant coil 450, the floating capacitance of the coil may be employed, or a capacitor may be provided connected across the ends of the coil.

Secondary self-resonant coil 450 has its number of windings set appropriately such that the Q value representing the resonance strength between the primary self-resonant coil of power feeding device 500 and secondary self-resonant coil 450 (for example, Q>100), the κ value representing the degree of coupling thereof and the like become higher based on the distance from the primary self-resonant coil, the resonant frequency of the primary self-resonant coil and secondary self-resonant coil 450, and the like.

Secondary coil 452 is arranged coaxial with secondary self-resonant coil 450, and can be coupled magnetically with secondary self-resonant coil 450 by electromagnetic induction. Secondary coil 452 extracts the electric power received by secondary self-resonant coil 450 through electromagnetic induction for output to rectifier 460. Secondary self-resonant coil 450 and secondary coil 452 constitute power reception unit 130 shown in FIG. 1.

Rectifier 460 rectifies AC power extracted by secondary coil 452. System main relay SMR2 is arranged between rectifier 460 and power storage device 120. System main relay SMR2 is set on/off according to a signal SE2 from vehicle ECU 440. A DC/DC converter for adjusting the voltage of the electric power rectified by rectifier 460 may be provided between rectifier 460 and system main relay SMR2, or between system main relay SMR2 and power storage device 120.

Vehicle ECU 440 generates signals PWC, PWI1 and PWI2 to drive boost converter 410, motor generator 430, and motor generator 432, respectively, based on the accelerator pedal position, vehicle speed, and signals from various sensors. The generated signals PWC, PWI1 and PWI2 are output to boost converter 410, inverter 420, and inverter 422, respectively.

In a vehicle running mode, vehicle ECU 440 sets system main relays SMR1 and SMR2 on and off, respectively. In the case where electric power can be received from power feeding device 500 (FIG. 1) during a running mode of the vehicle, vehicle ECU 440 may set system main relays SMR1 and SMR2 both on. In a power reception mode from power feeding device 500 external to the vehicle, vehicle ECU 440 sets system main relays SMR1 and SMR2 off and on, respectively.

Thus, in the present first embodiment, power reception unit 130 is stored in and located at the bottom of engine room 140. Since shielding member 150 is provided at the inner surface, for example, of engine room 140 where power reception unit 130 is stored, it is not necessary to additionally provide an exclusive shielding box or the like for storing power reception unit 130. According to the first embodiment, the mounting space of power reception unit 130 can be reduced, and blocking of the leakage electromagnetic field generated at the time of power reception can be realized at low cost.

Since shielding member 150 is provided at engine room 140 where power reception unit 130 is stored instead of providing a shielding structure at power reception unit 130 per se in the first embodiment, a long distance can be taken between power reception unit 130 and shielding member 150 (shielding distance), whereby reflected power is suppressed. According to the first embodiment, reduction in efficiency caused by providing a shielding structure can be suppressed.

Second Embodiment

The second embodiment has an interlock mechanism provided to interrupt power reception from power feeding device 500, if currently receiving electric power, or to prohibit power reception, if in a non-power reception mode, when the hood of engine room 140 where power reception unit 130 is stored is opened.

Figure 5:
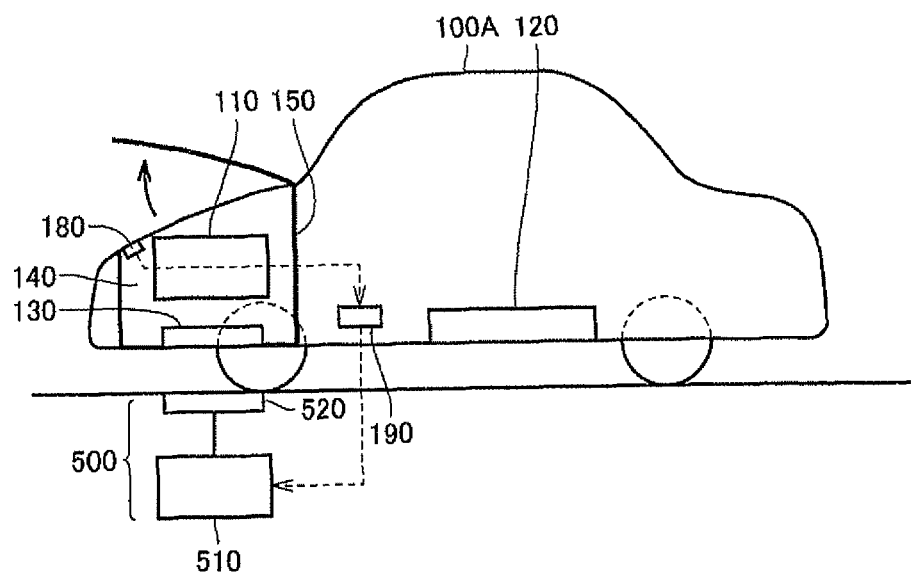
FIG. 5 represents an entire configuration indicating characteristic portions of a hybrid vehicle shown as an example of an electrical powered vehicle according to a second embodiment.

FIG. 5 represents an entire configuration indicating characteristic portions of a hybrid vehicle shown as an example of an electrical powered vehicle according to the second embodiment. Referring to FIG. 5, this hybrid vehicle 100A further includes an open/close sensor 180, and a communication device 190, in the configuration of hybrid vehicle 100 of FIG. 1.

Open/close sensor 180 detects the open/close state of the hood, and outputs the detection result to communication device 190. When the hood open state is detected by open/close sensor 180, communication device 190 transmits wirelessly to power feeding device 500 a signal designating interruption of power feeding from power feeding device 500 to hybrid vehicle 100A, if in a power feeding mode, or a signal designating prohibition of power feeding, if in a non-power feeding mode.

Upon receiving a signal designating interruption or prohibition of power feeding from communication device 190 of hybrid vehicle 100A, high frequency power source 510 of power feeding device 500 stops power feeding towards power transmission unit 520.

By the provision of an interlock mechanism in the second embodiment for interrupting or prohibiting power feeding from power feeding device 500 when the hood of engine room 140 where power reception unit 130 is stored is opened, the emission of the leakage electromagnetic field generated at the time of power reception from power feeding device 500, outside of engine room 140, can be prevented.

Third Embodiment

Figure 6:
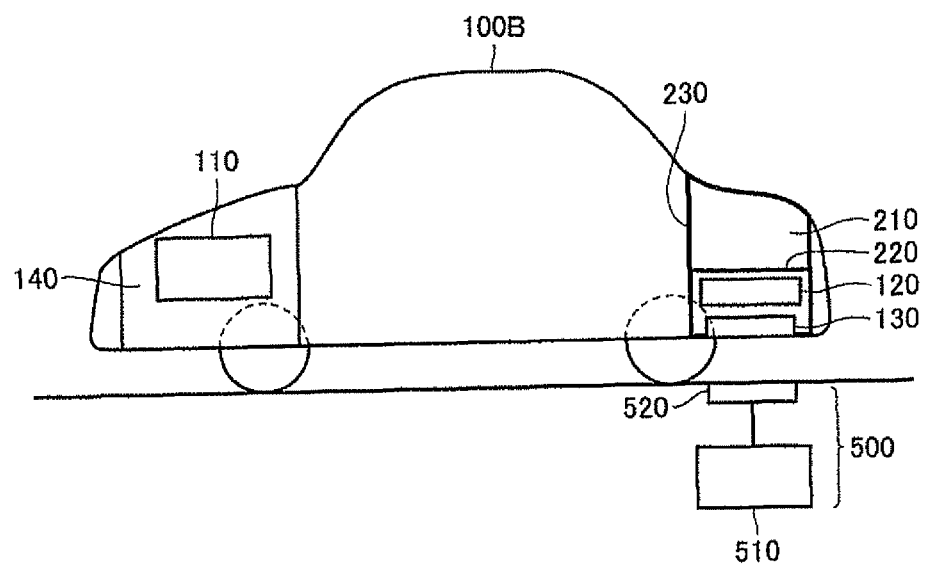
FIG. 6 represents an entire configuration indicating characteristic portions of a hybrid vehicle shown as an example of an electrical powered vehicle according to a third embodiment.

FIG. 6 represents an entire configuration indicating characteristic portions of a hybrid vehicle shown as an example of an electrical powered vehicle according to a third embodiment. Referring to FIG. 6 of this hybrid vehicle 100B, power storage device 120 is provided below a floor 220 of trunk room 210. Power reception unit 130 receiving electric power from power feeding device 500 is stored in trunk room 210. In detail, power reception unit 130 is arranged below power storage device 120, and at the bottom of trunk room 210.

In addition, shielding member 230 is provided to electromagnetically shield trunk room 210 from inside and outside. For example, shielding member 230 is formed of a cloth, sponge, or the like having an electromagnetic shielding effect, and is attached to the inner surface of trunk room 210. The bottom of trunk room 210 is opened at the site where at least power reception unit 130 is provided. Shielding member 230 is not provided at that opening.

The remaining configuration of hybrid vehicle 100B is similar to that of hybrid vehicle 100 according to the first embodiment shown in FIG. 1. The configuration of power feeding device 500 is also similar to that of the first embodiment.

In hybrid vehicle 100B, power reception unit 130 is stored in trunk room 210, and arranged at the bottom of trunk room 210. Shielding member 230 is provided at the inner surface, for example, of trunk room 210 where power reception unit 130 is stored. Accordingly, the space for mounting power reception unit 130 can be saved since it is not necessary to additionally provide an exclusive shielding box or the like for storing power reception unit 130. Since a long distance (shielding distance) can be taken between the power reception unit (secondary self-resonant coil) and the shielding member, reduction in efficiency caused by providing a shielding structure can be suppressed, likewise with the first embodiment.

The reason why power reception unit 130 is stored in trunk room 210, not in engine room 140, in the third embodiment, is that the wiring length between power storage device 120 and power reception unit 130 stored in trunk room 210 can be shortened.

Thus, the third embodiment can achieve effects similar to those of the first embodiment set forth above. The efficiency can be further improved according to the third embodiment since the wiring length between power storage device 120 and power reception unit 130 can be shortened.

Fourth Embodiment

The present fourth embodiment has an interlock mechanism provided to interrupt power reception from power feeding device 500, if currently receiving electric power, or to prohibit power reception, if in a non-power reception mode, when trunk room 210 where power reception unit 130 is stored is opened, likewise with the second embodiment with respect to the first embodiment.

Figure 7:
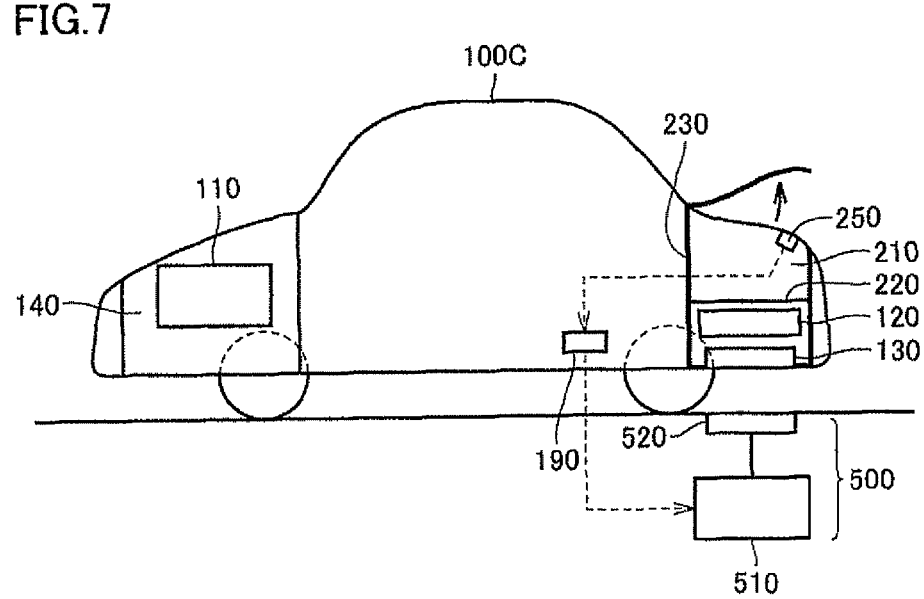
FIG. 7 represents an entire configuration indicating characteristic portions of a hybrid vehicle shown as an example of an electrical powered vehicle according to a fourth embodiment.

FIG. 7 represents an entire configuration indicating characteristic portions of a hybrid vehicle shown as an example of an electrical powered vehicle according to the fourth embodiment. Referring to FIG. 7, this hybrid vehicle 100C further includes an open/close sensor 250, and a communication device 190, in the configuration of hybrid vehicle 100B according to the third embodiment shown in FIG. 6.

Open/close sensor 250 detects the open/close state of trunk room 210, and outputs the detection result to communication device 190. When the open state of trunk room 210 is detected by open/close sensor 250, communication device 190 transmits wirelessly to power feeding device 500 a signal designating interruption of power feeding from power feeding device 500 to hybrid vehicle 100C, if in a power feeding mode, or a signal designating prohibition of power feeding, if in a non-power feeding mode.

By the provision of an interlock mechanism in the fourth embodiment for interrupting or prohibiting power feeding from power feeding device 500 when trunk room 210 where power reception unit 130 is stored is opened, the emission of the leakage electromagnetic field generated at the time of power reception from power feeding device 500, outside of trunk room 210, can be prevented.

Although each of the above embodiments is directed to power transmission by causing resonance between a primary self-resonant coil included in power transmission unit 520 of power feeding device 500 and a secondary self-resonant coil included in power reception unit 130 of the vehicle side, a pair of high dielectric disks may be used for the resonators. The high dielectric disk is formed of a material of high permittivity such as $TiO_2$, $BaTi_4O_9$, and $LiTaO_3$.

Although the second and fourth embodiments are described in which power feeding from power feeding device 500 is stopped by transmitting a signal designating interruption or prohibition of power feeding to power feeding device 500 when the hood or trunk room is opened, power reception can be prevented at the vehicle side by providing a shield plate at the bottom face of power reception unit 130, for example.

As an example of an electrical powered vehicle according to the present invention, a series/parallel type hybrid vehicle where the driving power of engine 434 is split by power split device 436 to be transmitted to driving wheel 438 and motor generator 430 has been described. The present invention is also applicable to other types of vehicle. For example, the present invention is applicable to the so-called series type hybrid vehicle using engine 434 only for driving motor generator 430, and the driving power of the vehicle is generated by motor generator 432 alone, a hybrid vehicle having only the regenerative energy among the kinetic energy generated by engine 434 collected as electric energy, a motor assistant type hybrid vehicle using the engine as the main driving source and assisted by the motor as necessary, and the like.

Further, the present invention is applicable to an electric vehicle that runs only by electric power, lacking an engine 434, or a fuel cell vehicle further including a fuel battery in addition to power storage device 120 as the DC power source. Although an electric vehicle and fuel cell vehicle not incorporating an engine do not have an engine room, a configuration may be employed in which power reception unit 130 is stored in a chamber where a motor generator generating running driving power and/or an electric power conversion device (inverter, boost converter, and the like) performing electric power conversion between the power storage device and motor generator are stored, and shield that chamber. Moreover, the present invention is applicable to an electrical powered vehicle lacking a boost converter 410.

In the description set forth above, motor generator 432 corresponds to "electric motor" of the present invention. Engine room 140 of the first and second embodiments and trunk room 210 of the third and fourth embodiments correspond to the "storage chamber" of the present invention. Engine 434 corresponds to the "internal combustion engine" of the present invention. Engine room 140 corresponds to the "engine room" of the present invention. Trunk room 210 corresponds to the "luggage compartment" of the present invention. Open/close sensors 180 and 250 correspond to the "detection device" of the present invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

The invention claimed is:

1. An electrical powered vehicle capable of generating running driving power by an electric motor using electric power supplied from a power feeding device provided external to the vehicle, the electrical powered vehicle comprising:
   a power reception unit including a power reception resonator configured to receive electric power from a power transmission resonator included in said power feeding device by resonating with said power transmission resonator through an electromagnetic field;

a power storage device configured to store electric power received by said power reception unit;

a storage chamber where said power reception unit is stored, the storage chamber having a door configured to open and close said storage chamber;

a shielding member configured to electromagnetically shield said storage chamber from inside and outside; and an interlock device configured to prohibit said electromagnetic field from being discharged outside of said storage chamber through an opening created when said door is in an open state.

2. The electrical powered vehicle according to claim 1, further comprising:

an internal combustion engine configured to generate energy for running, wherein said storage chamber is an engine room where said internal combustion engine is stored.

3. The electrical powered vehicle according to claim 2, wherein said power reception unit is arranged at a bottom of said storage chamber.

4. The electrical powered vehicle according to claim 2, wherein:

said interlock device is configured to interrupt or prohibit power reception from said power feeding device when said door is in said open state.

5. The electrical powered vehicle according to claim 1, wherein said storage chamber is a luggage compartment for storing a luggage of a user.

6. The electrical powered vehicle according to claim 5, wherein said power reception unit is arranged at a bottom of said storage chamber.

7. The electrical powered vehicle according to claim 5, wherein:

said interlock device is configured to interrupt or prohibit power reception from said power feeding device when said door is in said open state.

8. The electrical powered vehicle according to claim 1, wherein said storage chamber is a chamber where said electric motor is stored.

9. The electrical powered vehicle according to claim 8, wherein said power reception unit is arranged at a bottom of said storage chamber.

10. The electrical powered vehicle according to claim 8, wherein:

said interlock device is configured to interrupt or prohibit power reception from said power feeding device when said door is in said open state.

11. The electrical powered vehicle according to claim 1, further comprising:

an electric power conversion device configured to perform power conversion between a power supply line in the vehicle and said electric motor, wherein said storage chamber is a chamber where said electric power conversion device is stored.

12. The electrical powered vehicle according to claim 11, wherein said power reception unit is arranged at a bottom of said storage chamber.

13. The electrical powered vehicle according to claim 11, wherein:

said interlock device is configured to interrupt or prohibit power reception from said power feeding device when said door is in said open state.

14. The electrical powered vehicle according to claim 1, wherein said power reception unit is arranged at a bottom of said storage chamber.

15. The electrical powered vehicle according to claim 1, wherein:

said interlock device includes a device configured to interrupt or prohibit power reception from said power feeding device when said door is in said open state.

16. The electrical powered vehicle according to claim 15, wherein said interlock device includes:

a detection device configured to detect an open/close state of said door, and a communication device configured to transmit to said power feeding device a command designating interruption or prohibition of power transmission from said power feeding device when an open state of said door is detected by said detection device.

17. The electrical powered vehicle according to claim 15, wherein said interlock device further includes a shield plate located between said power feeding device and said power reception unit when said open state of said door is detected.

* * * * *